United States Patent
Huang et al.

(10) Patent No.: US 8,466,787 B2
(45) Date of Patent: Jun. 18, 2013

(54) SERVICE METHOD OF GAS APPLIANCES

(75) Inventors: Chung-Chin Huang, Taichung (TW); Chin-Ying Huang, Taichung (TW); Hsin-Ming Huang, Taichung (TW); Hsing-Hsiung Huang, Taichung (TW)

(73) Assignee: Grand Mate Co., Ltd., Taichung (TW)

( * ) Notice: Subject to any disclaimer, the term of this patent is extended or adjusted under 35 U.S.C. 154(b) by 280 days.

(21) Appl. No.: 13/047,609

(22) Filed: Mar. 14, 2011

(65) Prior Publication Data

US 2012/0235813 A1 Sep. 20, 2012

(51) Int. Cl.
*G08B 21/00* (2006.01)
(52) U.S. Cl.
USPC ............. 340/540; 340/632; 431/164; 431/22; 431/24
(58) Field of Classification Search
USPC ................... 340/540, 632, 633, 634; 431/22, 431/24, 16
See application file for complete search history.

(56) References Cited

U.S. PATENT DOCUMENTS

| | | | | |
|---|---|---|---|---|
| 5,711,606 A | * | 1/1998 | Koether | 374/149 |
| 7,774,282 B2 | * | 8/2010 | Baraty | 705/63 |

* cited by examiner

*Primary Examiner* — Toan N Pham
(74) *Attorney, Agent, or Firm* — Tracy M. Heims; Apex Juris, pllc (57) ABSTRACT

A service method of gas appliances includes: Detecting the gas appliances at the client ends to generate detecting signals. Transmitting the detecting signals to a service end. Identifying which client end the detecting signals come from. Examining the detecting signals to find whether the gas appliance has an abnormal condition; and informing the client end when the abnormal condition is found. After all, the service end may monitor the gas appliances at the client end, and inform the client for repair when the gas appliance has detected an abnormal signal or has damaged parts.

12 Claims, 7 Drawing Sheets

SERVICE METHOD OF GAS APPLIANCES

BACKGROUND OF THE INVENTION

1. Field of the Invention

The present invention relates generally to a business model, and more particularly, to a service method of gas appliances.

2. Description of the Related Art

Gas appliances, including water heater, gas stove, fireplace, and other devices of burning gas, with the purpose to heat something, are familiar to all in home life. Take water heater for instance, the dealer installs the water heater at the consumer's house after he/she buys it. For better ventilation and safety reasons, the water heaters are often requested to be installed outdoors. Over time, some parts of the water heater can be damaged due to exposure to sun, rain, and wind; or simply due to old-age. With a slight damage in parts, the water heater can result in poor efficiency for heating, and with a more serious damage, it may result in gas leakage, or may create greater issue for safety. All this can be easily avoided by replacing the damaged parts to keep the water heater in normal function.

Typically, there are two conventional ways of service for water heaters, including:

One way being, the dealer sends a technician to the user's place to examine and repair the water heater after he/she receives a call. This usually happens after the user finds a problem with the water heater, and usually, the user never finds it until it becomes a serious problem. Sometimes, it can be too late, as the water heater itself suffered from too many problems that the user has to end up paying more for repairs.

The other way being, the dealer sends technician to the user's place for random checks, and appoints the date for the next check, judging upon the condition of the water heater at the time of the check. The technician may be able to find the problem with the water heater when it is just trivial. However, he/she has to make an appointment with the user, and that is a tough job. Even when this kind of service is free, users still have to spend time waiting for the technicians to arrive. A lot of users refuse this type of service because of its inconvenience with time. Furthermore, this type of service usually has difficulty detecting a problem with the water heater at the time of the problem's occurrence.

SUMMARY OF THE INVENTION

The primary objective of the present invention is to provide a service method of gas appliances, which provides a real-time detection, automatic report, and analysis for repair.

According to the objective of the present invention, a service method of gas appliances includes: Detect the gas appliances at client ends to generate detecting signals. Transmitting the detecting signals to a service end. Identifying which client end the detecting signals come from. Examining the detecting signals to find whether the gas appliance has an abnormal condition; and informing the client end when the abnormal condition is found.

In an embodiment, a service method of gas appliances includes: Detecting the gas appliances at the client ends to generate detecting signals. Examining the detecting signals to find whether the gas appliance has an abnormal condition. Transmitting an abnormal signal to the service end when the abnormal condition is found. Identifying which client end the abnormal signal comes from; and finally, informing the client end what is being found.

In an embodiment, the communication between the service end and the client ends is through a communication medium, such as the Internet.

In an embodiment, the client end transmits an ID code, together with the detecting signals or the abnormal signal to the service end for identifying which client end the signals are from.

DETAILED DESCRIPTION OF THE INVENTION

The present invention provides a service method and system for gas appliances, such as water heater, gas stove, and fireplace. The service system includes a service end to monitor gas appliances of a plurality of client ends in a predetermined area through a communication medium. When gas appliance of the client end has an abnormal condition, the service end can detect it at once. At the same time, the service will analyze the abnormal condition and call the client to appoint a time for repair when the result of the analysis shows that it needs to be repaired. As a result, the gas appliances may be in a good condition for normal operation for a long time to come. The "predetermined area" may be decided by a distance to the service end, or the number of the client ends that a service end could afford to keep a good and stable service.

Figure 1:
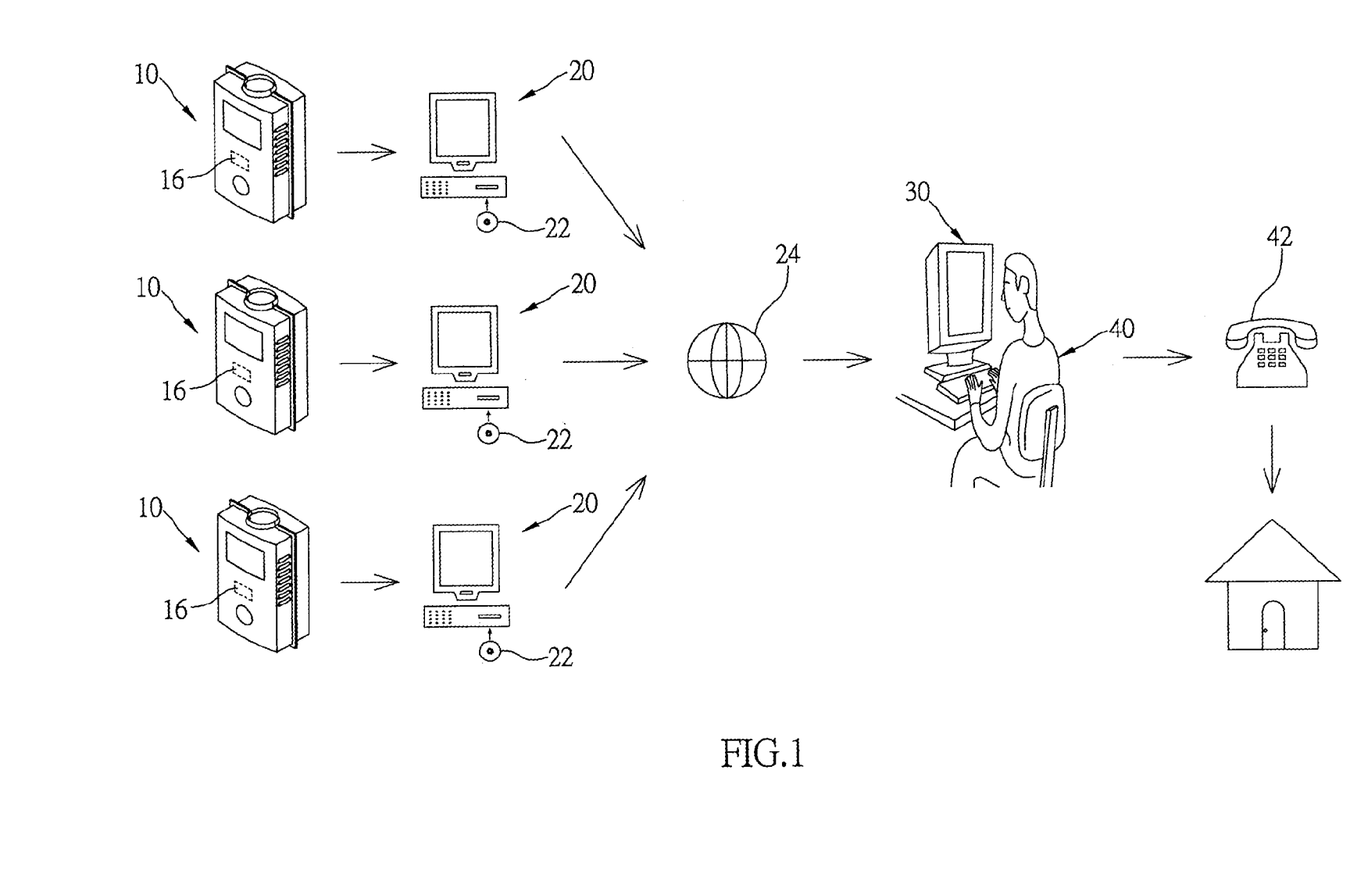
FIG. 1 is a sketch diagram of the sequence of the service of a first preferred embodiment of the present invention.
Figure 2:
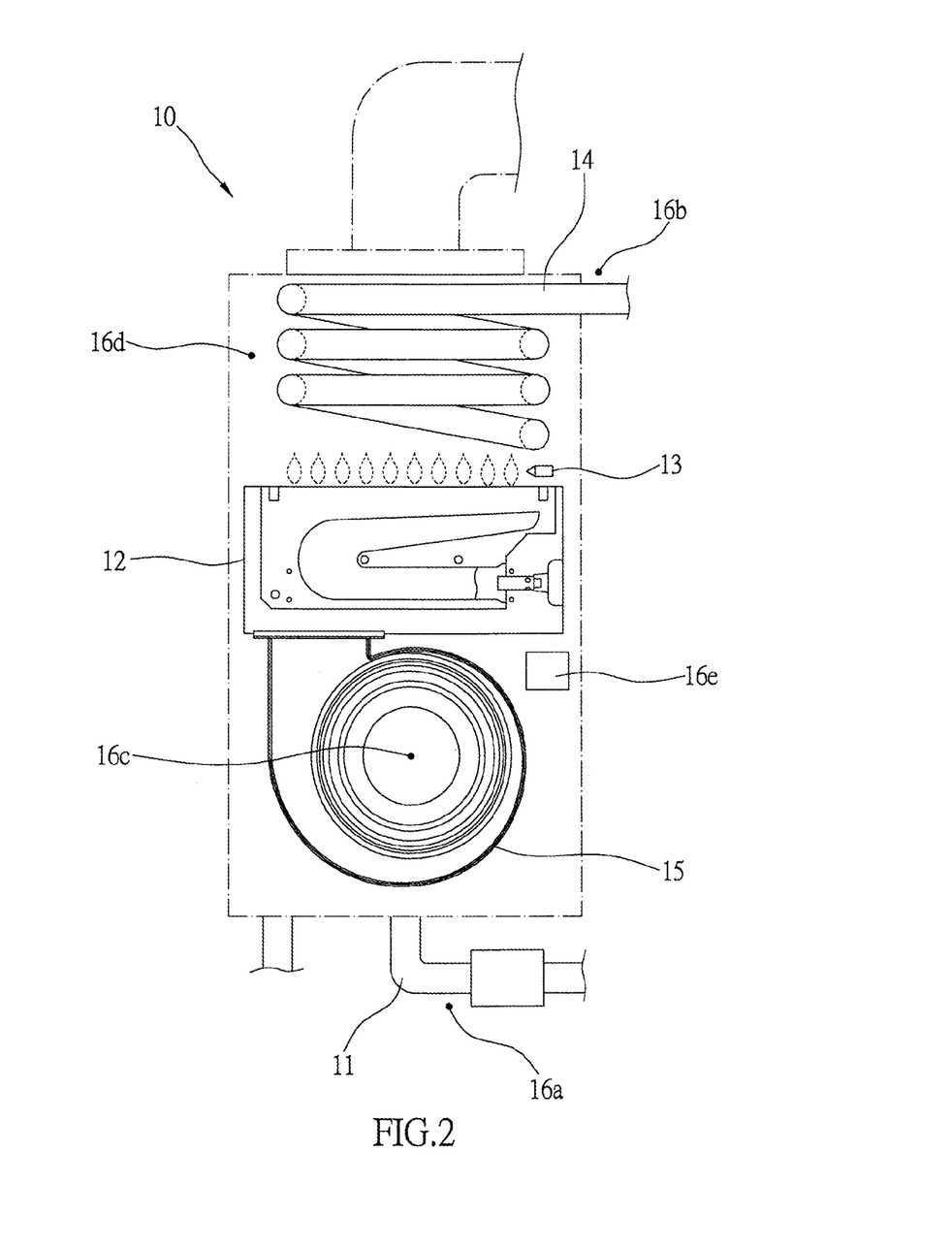
FIG. 2 is a sectional view of the water heater of the first preferred embodiment of the present invention.
Figure 3:
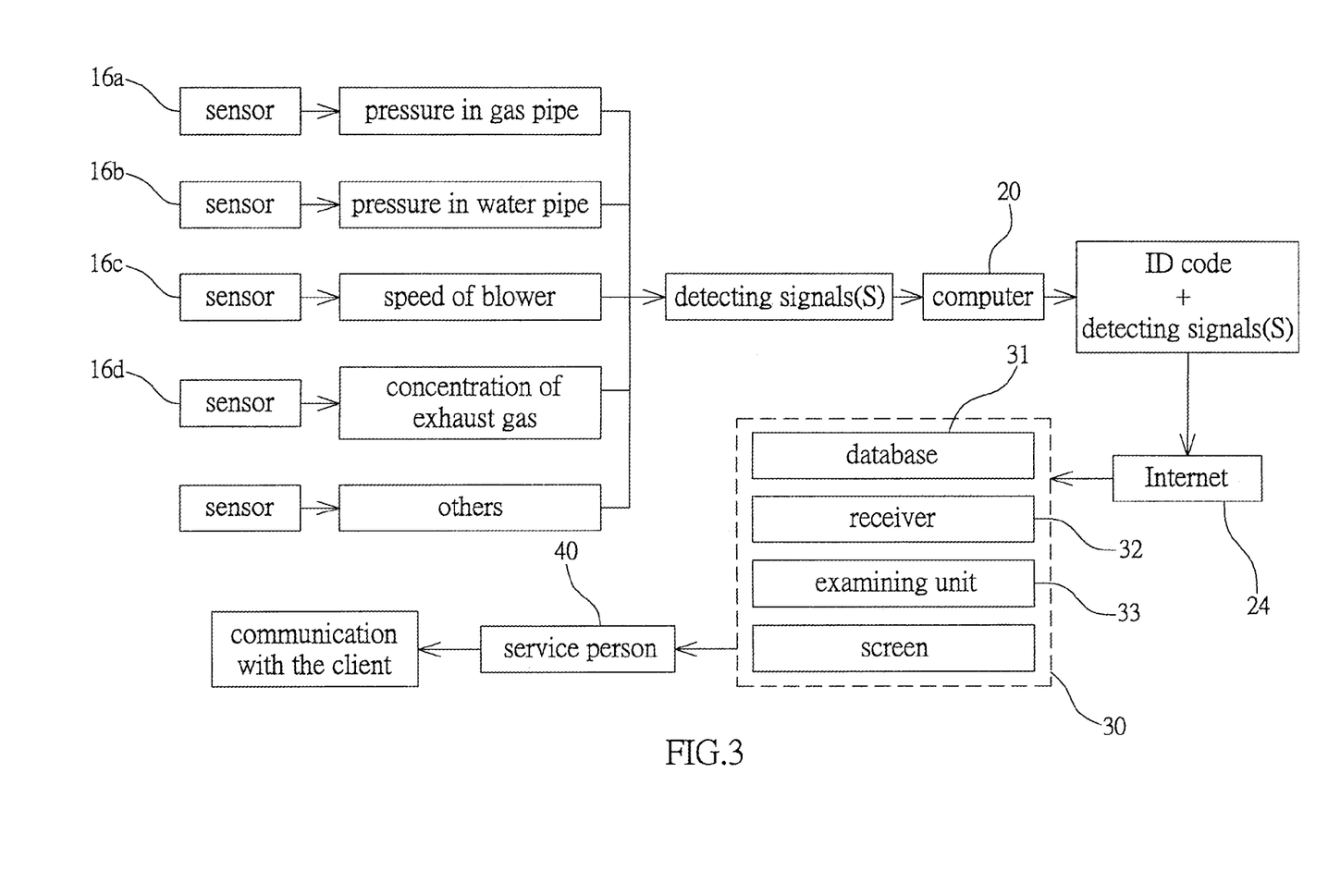
FIG. 3 is a flow chart of the preferred embodiment of the first present invention.

As shown in FIG. 1 to FIG. 3, a service system of gas appliances of the first preferred embodiment in a predetermined area includes a plurality of client end each having at least a gas appliance 10, a computer 20, and a service end having a monitor apparatus 30.

In the present invention, we take water heater to be the gas appliance 10. The water heater 10, as shown in FIG. 2, has a gas pipe 11, a plurality of burners 12, an igniter 13, a water pipe 14, a blower 15, and a detection module 16.

The gas pipe 11 supplies gas to the burners 12, and the igniter 13 lights the fire to heat water in the water pipe 14. The blower 15 is under the burners 12 to blow air into the water heater 10.

The detection module 16 includes a plurality of sensors 16a~16d for various purposes—the sensor 6a senses a pressure in the gas pipe 11, the sensor 16b senses a pressure in the water pipe 14, the sensor 16c senses the speed of the blower 15, and the sensor 16d senses exhaust gas after burning. The detection module 16 may have more sensors to detect the other parts or conditions of the water heater 10. These sensors 16a~16d generate detecting signals S and transmit out via a transmitter 16e.

In each of the client ends, the computer 20 is connected to the water heater 10 that transmitter 16e of the detection module 16, may transmit the detecting signals S to the computer 20. A CD 22, in which an ID code and programs are installed, is provided when the client brought the water heater 10, and the client, or by the help of technician, installs the programs in the computer 20, after that, the computer 20 will be communicating with the monitor apparatus 30 of the service end through the communication medium 24, such as the Internet. The programs will gather the detecting signals S from the sensors 16a~16d and send them to the service end.

The service end includes the monitor apparatus 30, and some service persons 40, including operators and technicians. In the present invention, the monitor apparatus 30 includes a computer having a programmable database 31, a receiver 32, and an examining unit 33.

The database 21 stores parameters of gas pressure, water pressure, speed of the blower, concentration of exhaust gas, etc. in normal conditions Information of clients, such as names, addresses, telephone numbers, e-mails, and model of the water heater, etc., are also stored in the database 21.

The receiver 32 is connected to the communication medium 24 to receive messages from each client end. The messages will include the detecting signals S, the ID code, and other relative messages. These messages are then compared to the data in the database to detect which client is sending the detecting signals S.

The examining unit 33 compares the detecting signals S with the data in the database 31, to generate an abnormal signal when the detecting signal S is beyond a normal range, then; it is shown on a screen of the monitor apparatus 30. In the present invention, the monitor apparatus 30 only shows the abnormal signals and the client's information to avoid confusing the service persons by giving them too much information.

After the service person finds an abnormal condition happening at a client end, he/she is then asked to inform the client what happened to his/her water heater, thus make an appointment for repair. The technician is already aware of the damaged parts of the water heater before he/she arrives at the client's place, this means he/she will not take as long to repair the water heater. The ways of informing the client may be by telephone, e-mail, or other forms of communications. The service end may periodically send e-mails to all of the clients to report the condition of his/her water heater.

Figure 4:
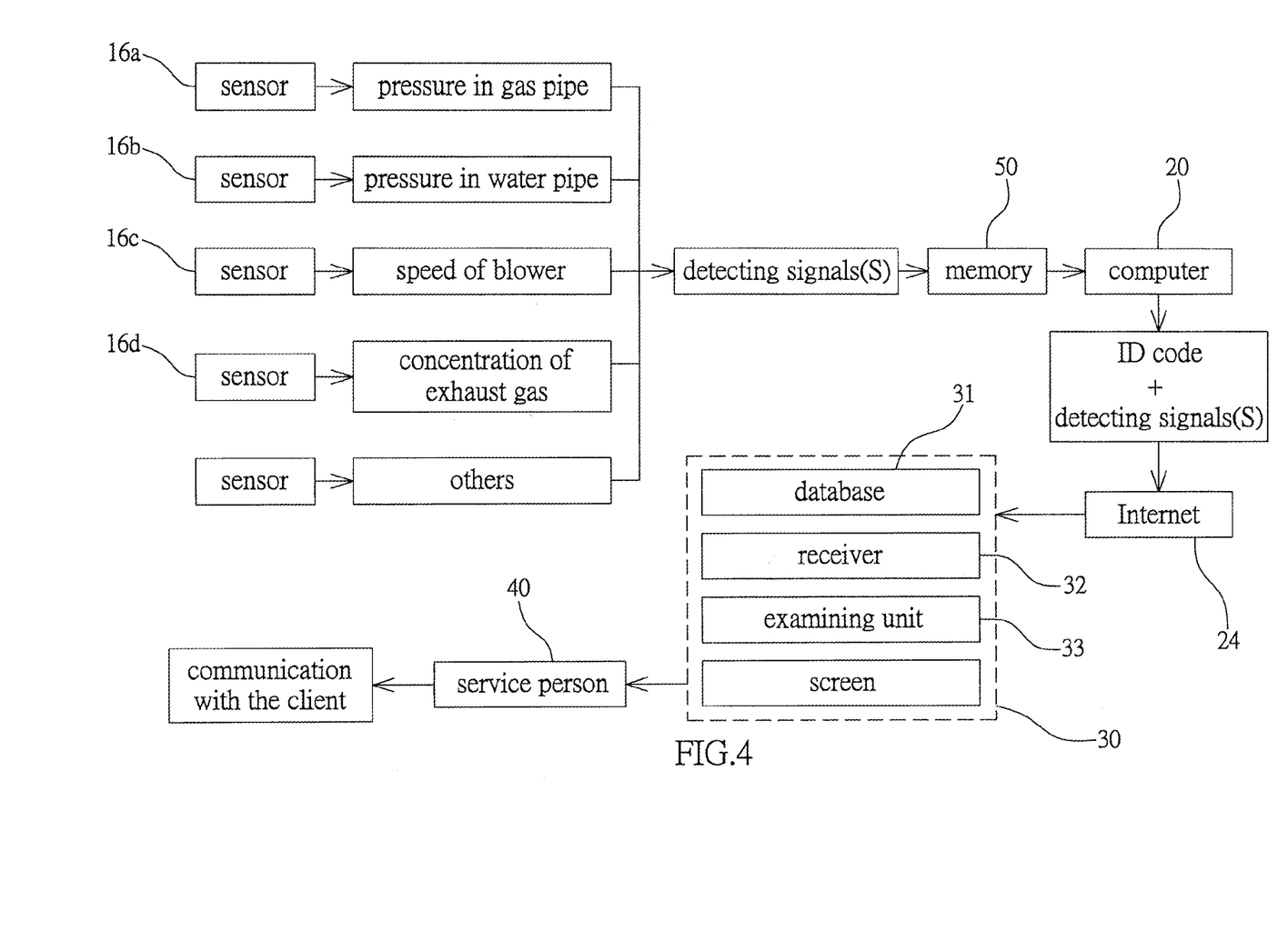
FIG. 4 is a flow chart of a second preferred embodiment of the present invention.

FIG. 4 shows a flow chart of a service method of the second preferred embodiment of the present invention, which is similar to the first preferred embodiment except that, a system of the second preferred embodiment further includes a memory 50 to store the detecting signals S of the last detection when the computer 20 is turned off, then, the detecting signals S will be automatically transmitted to monitor apparatus 30 of the service end, through the communication medium 24, when the computer 20 is turned on.

Figure 5:
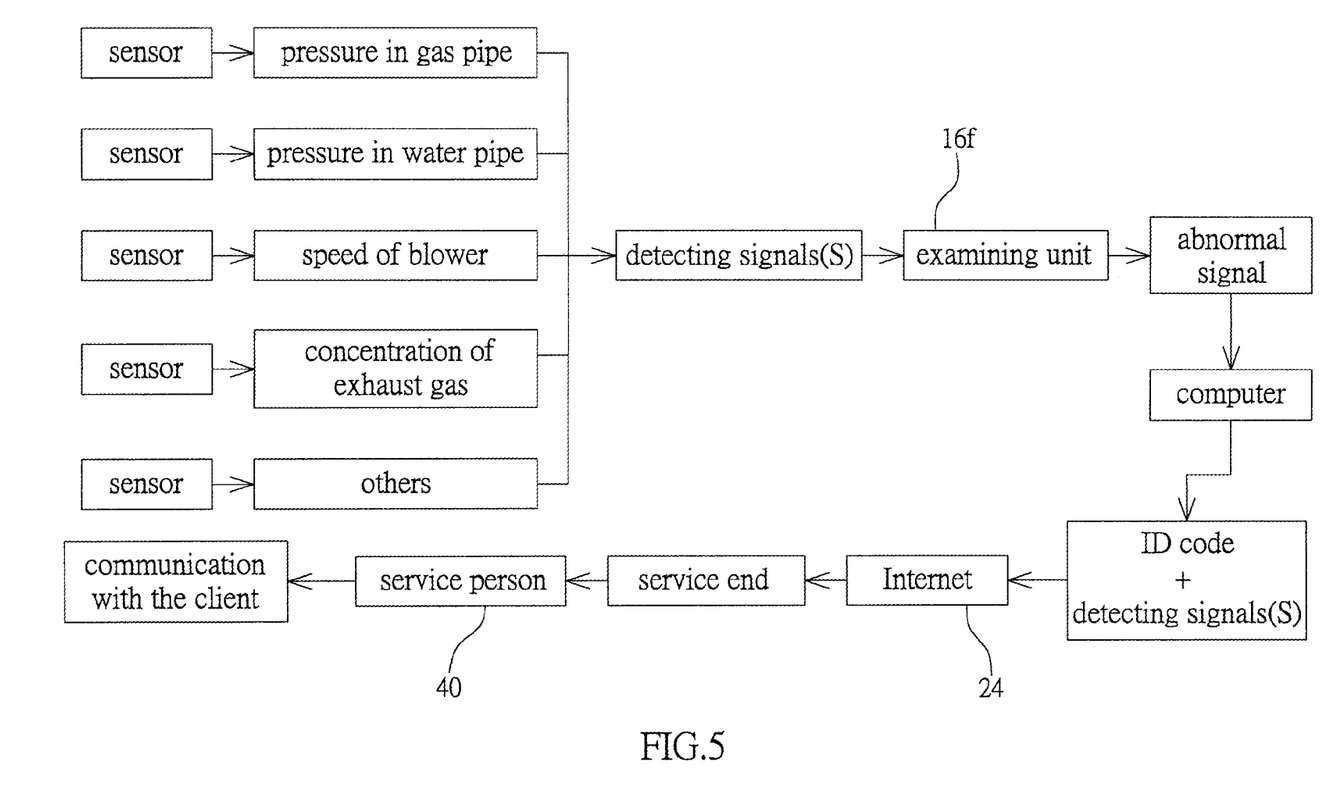
FIG. 5 is a flow chart of a third preferred embodiment of the present invention.

FIG. 5 shows a flow chart of a service method of the third preferred embodiment of the present invention, which is similar to the first preferred embodiment except that the detecting signals are examined at the client end, rather than at the service end. A detection module 16 of the third preferred embodiment includes an examining unit 16f, in which parameters of the water heater 10 in normal function, are stored to be compared with the detecting signals S, to find out about the abnormal condition hence transmitting it, along with the ID code, to the service end through the computer 20, and the communication medium 24. The monitor apparatus at the service end can only verify the ID code and display the abnormal message on the screen, but it does not carry out the examining functions. Same as what was mentioned before, the service person will then inform the client when he/she receives the abnormal message.

Figure 6:
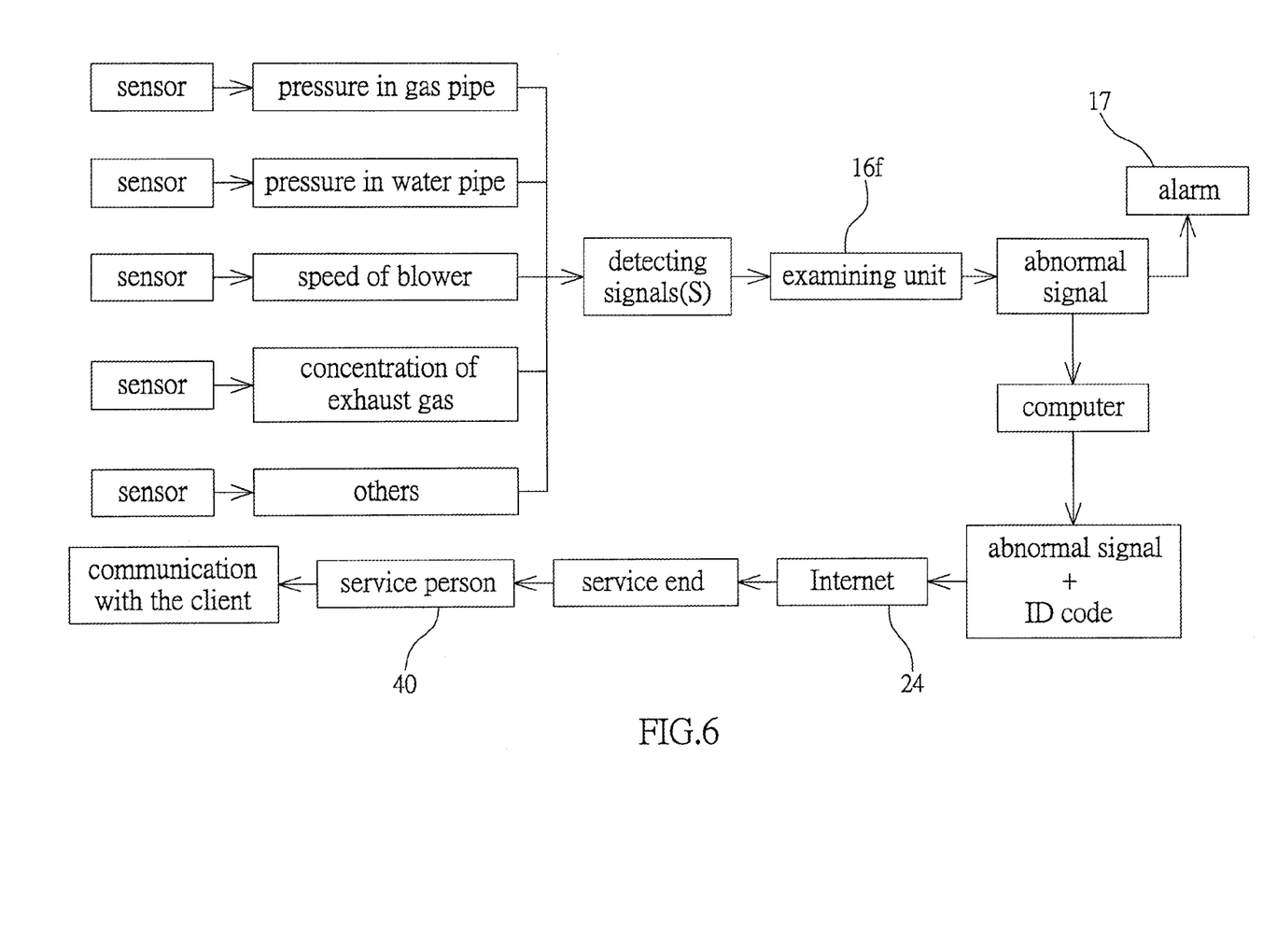
FIG. 6 is a flow chart of a fourth preferred embodiment of the present invention.

FIG. 6 shows a flow chart of a service method of the fourth preferred embodiment of the present invention, which is similar to the third preferred embodiment except that, the water heater here is provided with an alarm 17, electrically connected to the detection module 16, to send off a buzzing sound, or flash when an abnormal condition is detected. A design as such allows both the service end and the user, to receive the abnormal message promptly; so that the user can also double-check when he/she receives a call from the service person.

Figure 7:
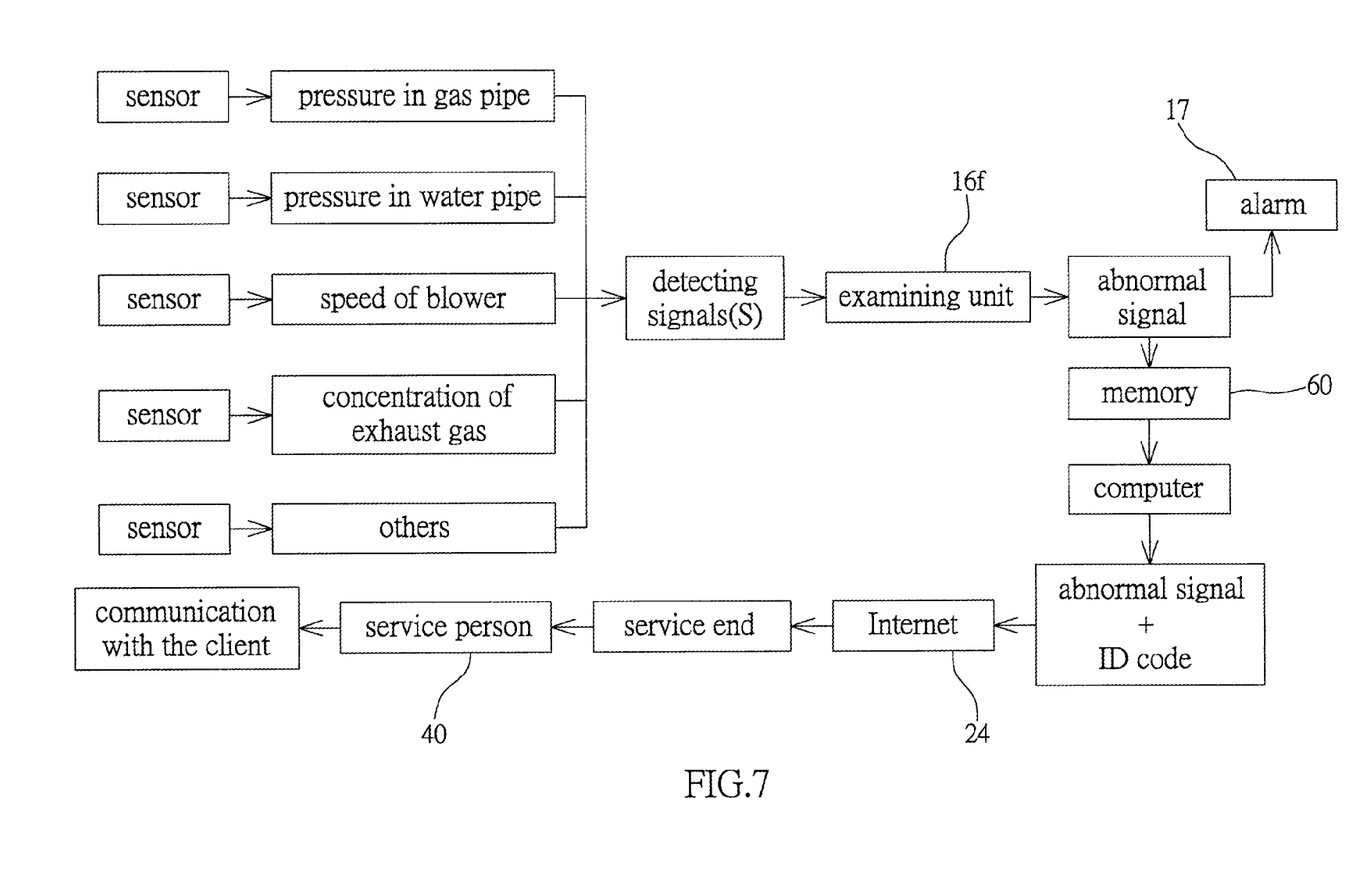
FIG. 7 is a flow chart of a fifth preferred embodiment of the present invention.

FIG. 7 shows a flow chart of a service method of the fifth preferred embodiment of the present invention. The fifth preferred embodiment uses the systems of the third preferred embodiment or the fourth preferred embodiment, plus a memory 60, which is the same as the memory 50 of the second preferred embodiment. In other words, the system of the fifth preferred embodiment stores the detecting signals S of the last detection in the memory 60, then transmits them to monitor apparatus 30, the service end, through to the communication medium 24 when the computer 20 is turned on.

The description above is a few preferred embodiments of the present invention and is also equivalent to the invention itself. The structures and the service methods are still well within the scope of claim, of the present invention.

What is claimed is:

1. A service method of gas appliances, including a service end and a plurality of client ends, each of which has at least a gas appliance, the method comprising the steps of:
   detecting the gas appliances at the client ends to come up with corresponding detecting signals;
   transmitting the detecting signals to the service end;
   identifying which client end the detecting signals come from;
   examining the detecting signals to find whether the gas appliance has an abnormal condition; and
   informing the client end when the abnormal condition is found.

2. The service method as defined in claim 1, wherein the detecting signals are transmitted to the service end through a communication medium.

3. The service method as defined in claim 2, wherein the communication medium is the Internet.

4. The service method as defined in claim 3, further comprising the step of storing the detecting signals in a memory, and transmitting the detecting signals to the service end when the client end is connected to the internet.

5. The service method as defined in claim 2, wherein the service end informs the client end the abnormal condition through the Internet.

6. The service method as defined in claim 2, wherein the client end further transmits an ID code, together with the detecting signals for identification of the client end.

7. A service method of gas appliances, which includes a service end and a plurality of client ends, each of which has at least a gas appliance, the method comprising the steps of:
   detecting the gas appliances at the client ends to come up with corresponding detecting signals;
   examining the detecting signals to find whether the gas appliance has an abnormal condition;
   transmitting an abnormal signal to the service end when the abnormal condition is found; and
   identifying which client end the abnormal signal comes from; and
   informing the client end.

8. The service method as defined in claim 7, wherein the detecting signals are transmitted to the service end through a communication medium.

9. The service method as defined in claim 8, wherein the communication medium is the Internet.

10. The service method as defined in claim 9, further comprising the step of storing the abnormal signal in a memory and transmitting the abnormal signal to the service end when the client end is connected to the Internet.

11. The service method as defined in claim 8, wherein the client end further transmits an ID code, together with the detecting signals for identification of the client end.

12. The service method as defined in claim 7, further comprising the step of providing an alarm at the client end when the abnormal condition is found.

* * * * *